United States Patent
Maeda

(10) Patent No.: US 12,054,394 B2
(45) Date of Patent: Aug. 6, 2024

(54) REDUCED GRAPHENE-BASED MATERIAL

(71) Applicant: NEC CORPORATION, Tokyo (JP)

(72) Inventor: Katsumi Maeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 851 days.

(21) Appl. No.: 16/972,356

(22) PCT Filed: Jun. 4, 2019

(86) PCT No.: PCT/JP2019/022139
§ 371 (c)(1),
(2) Date: Dec. 4, 2020

(87) PCT Pub. No.: WO2019/235469
PCT Pub. Date: Dec. 12, 2019

(65) Prior Publication Data
US 2021/0230002 A1 Jul. 29, 2021

(30) Foreign Application Priority Data
Jun. 5, 2018 (JP) .................... 2018-107533

(51) Int. Cl.
*H01M 10/05* (2010.01)
*C01B 32/194* (2017.01)
*H01M 10/0525* (2010.01)
*H01M 10/0568* (2010.01)
*H01M 10/0569* (2010.01)

(52) U.S. Cl.
CPC ....... *C01B 32/194* (2017.08); *H01M 10/0525* (2013.01); *H01M 10/0568* (2013.01); *H01M 10/0569* (2013.01); *C01P 2002/85* (2013.01); *H01M 2300/0028* (2013.01)

(58) Field of Classification Search
None
See application file for complete search history.

(56) References Cited

U.S. PATENT DOCUMENTS

| 2015/0162644 A1* | 6/2015 | Fujii | H01M 10/052 |
| | | | 429/199 |
| 2018/0226678 A1* | 8/2018 | Haruna | H01M 10/0568 |
| 2021/0226207 A1* | 7/2021 | Cheng | H01M 4/625 |

FOREIGN PATENT DOCUMENTS

| JP | 2013-191552 A | 9/2013 |
| JP | 2017-33839 A | 2/2017 |
| WO | 2014/203621 A1 | 12/2014 |
| WO | 2017/029692 A1 | 2/2017 |
| WO | 2017/217408 A1 | 12/2017 |
| WO | WO 2017217408 | * 12/2017 ........ H01M 10/0567 |

OTHER PUBLICATIONS

International Search Report for PCT/JP2019/022139 dated, Jul. 30, 2019 (PCT/ISA/210).

* cited by examiner

*Primary Examiner* — Maria Laios
*Assistant Examiner* — Angela J Martin
(74) *Attorney, Agent, or Firm* — Sughrue Mion, PLLC

(57) ABSTRACT

An object of the present invention is to provide a reduced graphene-based material to improve charge/discharge efficiency of a lithium ion secondary battery. The reduced graphene-based material of the present invention has a coating containing lithium element (Li), phosphorus element (P), fluorine element (F), and oxygen element (O) on at least a part of the surface, wherein in the elemental composition of the surface as measured by X-ray photoelectron spectroscopy (XPS), the proportion of lithium element (Li) is 0.8 to 2.0 (atomic %), the proportion of phosphorus element (P) is 0.5 to 2.0 (atomic %), the proportion of fluorine element (F) is 0.05 to 1.0 (atomic %), and the proportion of oxygen element (O) is 7.0 to 12.0 (atomic %).

4 Claims, No Drawings

REDUCED GRAPHENE-BASED MATERIAL

TECHNICAL FIELD

The present invention is directed to a reduced graphene-based material, a method for producing the same, and a lithium-ion secondary battery using the same.

BACKGROUND ART

Lithium ion secondary batteries have been already put to practical use as batteries for small electronic devices such as notebook computers, cellular phones and the like because of their advantages of high energy density, small self-discharge, excellent long-term reliability and the like. In recent years, the development of lithium-ion secondary batteries for electric vehicles, household storage batteries, and electric power storage has been progressing.

In lithium ion secondary batteries, carbon materials are generally used as a negative electrode active material, and various carbon materials have been proposed for improving battery characteristics. Examples of known carbon materials include high crystalline carbons such as natural graphite and artificial graphite, low crystalline carbons such as easily graphitizable carbon (soft carbon) and hardly graphitizable carbon (hard carbon), and noncrystalline carbon (amorphous carbon) and the like.

High energy density is required in such a lithium ion secondary battery, and a material having a high energy density is required not only for the positive electrode active material but also for the negative electrode active material. For example, Patent Document 1 discloses a lithium ion secondary battery in which reduced graphene obtained by heat-reducing an oxidized graphene is used as a negative electrode active material in order to improve energy density. Further, Patent Document 2 discloses a negative electrode made of a mixture of silicon and reduced graphene.

CITATION LIST

Patent Literature

Patent Document 1: WO 2017/029692
Patent Document 2: Japanese Patent Laid-Open Publication No. 2013-191552

SUMMARY OF INVENTION

Technical Problem

However, in the lithium ion secondary batteries using the reduced graphene described in Patent Document 1 and Patent Document 2 as the negative electrode active material, the initial charge/discharge efficiency is low and the irreversible capacity of the battery is large, which decreases the battery capacity that can be actually used, and therefore, it is demanded to improve the initial charge/discharge efficiency.

In view of the above-mentioned problems, an object of the present invention is to provide a reduced graphene-based material to improve the charge/discharge efficiency of lithium ion secondary batteries.

Solution to Problem

The reduced graphene-based material of the present invention is a reduced graphene-based material having a coating containing lithium element (Li), phosphorus element (P), fluorine element (F), and oxygen element (O) on at least a part of the surface, wherein in the elemental composition of the surface as measured by X-ray photoelectron spectroscopy (XPS), the proportion of lithium element (Li) is 0.8 to 2.0 (atomic %), the proportion of phosphorus element (P) is 0.5 to 2.0 (atomic %), the proportion of fluorine element (F) is 0.05 to 1.0 (atomic %), and the proportion of oxygen element (O) is 7.0 to 12.0 (atomic %).

Further, the method for producing a reduced graphene-based material of the present invention comprises a step of heat-treating an oxidized graphene together with lithium difluorophosphate.

Advantageous Effect of Invention

According to the reduced graphene-based material of the present invention, it is possible to provide a lithium ion secondary battery having a high capacity and improved initial charge/discharge efficiency.

DESCRIPTION OF EMBODIMENTS

Hereinafter, embodiments for carrying out the present invention will be described. However, although the embodiments described below include technically preferable limitations for carrying out the present invention, the scope of the invention is not limited to the following.

The present inventors have conducted intensive studies to solve the above-mentioned problems. As a result, they have found that the initial charge/discharge efficiency of a lithium ion secondary battery can be improved by using a reduced graphene-based material having a coating derived from lithium difluorophosphate on at least a part of the surface for the negative electrode, and the present invention has been completed.

The details of the reason why the coating derived from lithium difluorophosphate improves the charge/discharge efficiency are unknown, but it is presumed that, for example, the side reaction on the surface of the negative electrode active material is suppressed, the irreversible capacity is reduced, and the initial charge/discharge efficiency is improved.

The reduced graphene-based material and the lithium ion secondary battery using the reduced graphene-based material according to the present embodiments will be described in detail below.

<Reduced Graphene-Based Material>

The reduced graphene-based material is a carbon material comprising reduced graphene. Graphene is a sheet of $sp^2$ bonded carbon atoms having a thickness of one atom. By oxidizing graphene, an oxidized graphene containing an oxygen functional group such as hydroxyl group, epoxy group and carboxyl group and having defects can be obtained. Reduced graphene is a material obtained by reducing this oxidized graphene.

The oxygen functional groups such as hydroxyl group, epoxy group and carboxyl group are removed by the reduction treatment, but typically, they are not completely removed and partially remain. Therefore, reduced graphene also has oxygen functional groups and defects, but not as much as the oxidized graphene.

The reduced graphene-based material according to the present embodiment has a coating derived from lithium difluorophosphate on at least a part of the surface thereof. By heat-treating oxidized graphene particles together with lithium difluorophosphate, the oxidized graphene can be reduced and a coating derived from lithium difluorophosphate can be formed on the surface of the resulting reduced graphene-based material particles. An oxidized graphene can be synthesized by conventionally known methods such as the Hammers method or the Brodie method. For example, an oxidized graphene can be synthesized by oxidizing artificial graphite, natural graphite or the like with an oxidizing agent such as potassium permanganate or potassium chlorate in a strong acid such as sulfuric acid or fuming nitric acid. The shape of graphite used as a raw material is not particularly limited, and may be, for example, spherical, scaly, rod-shaped, amorphous or the like. In order to uniformly form a coating on the surface, it is preferable, for example, to disperse oxidized graphene in a solution in which lithium difluorophosphate is dissolved, distil off a solvent, and then heat-treat. Examples of the solvent for dissolving lithium difluorophosphate include acetonitrile, water, N-methyl-2-pyrrolidone and the like. The temperature of the heat treatment is preferably 500 to 1000° C., more preferably 600 to 800° C. The heat treatment is preferably performed under vacuum, or under an inert gas stream such as nitrogen or argon. The amount of lithium difluorophosphate may be appropriately determined depending on its application. In one embodiment, the amount of lithium difluorophosphate is preferably 15 parts by mass or less, more preferably 10 parts by mass or less, still more preferably 7 parts by mass or less, relative to 100 parts by mass of oxidized graphene. Generally, the amount of lithium difluorophosphate is 0.1 part by mass or more relative to 100 parts by mass of oxidized graphene.

The lower limit of the average particle size of the reduced graphene-based material particles is preferably 1 µm or more, and more preferably 3 µm or more. The upper limit of the average particle size of the reduced graphene-based material particles is preferably 50 µm or less, and more preferably 30 µm or less. In the present specification, the average particle size represents the particle size at 50% in a volume-based cumulative distribution. The average particle size can be measured by a laser diffraction/scattering particle size distribution measuring device.

The coating is derived from lithium difluorophosphate, and contains lithium element (Li), phosphorus element (P), fluorine element (F), and oxygen element (O) as constituent elements. Although the details of the chemical state of the coating are unknown, the elemental composition of the surface of the reduced graphene-based material can be measured by X-ray photoelectron spectroscopy (XPS). According to the surface analysis by X-ray photoelectron spectroscopy of the reduced graphene-based material according to the present embodiment, the proportion of lithium element (Li) is 0.8 to 2.0 (atomic %), preferably 0.9 to 1.4 (atomic %), the proportion of phosphorus element (P) is 0.5 to 2.0 (atomic %), preferably 0.6 to 1.1 (atomic %), the proportion of fluorine element (F) is 0.05 to 1.0 (atomic %), preferably 0.1 to 0.3 (atomic %), and the proportion of oxygen element (O) is 7.0 to 12.0 (atomic %), preferably 8.5 to 9.5 (atomic %). Further, it is not particularly limited, but according to the surface analysis by X-ray photoelectron spectroscopy of the reduced graphene-based material according to the present embodiment, the proportion of carbon element (C) is typically 80.0 to 95.0 (atomic %), preferably 87.0 to 90.0 (atomic %).

According to the surface analysis by X-ray photoelectron spectroscopy of the reduced graphene-based material according to the present embodiment, the atom number ratio of fluorine atoms based on lithium atoms (Fi/Li) is preferably 0.01 to 0.3, more preferably 0.05 to 0.1. According to the surface analysis by X-ray photoelectron spectroscopy of the reduced graphene-based material according to the present embodiment, the atom number ratio of phosphorus atoms based on lithium atoms (P/Li) is preferably 0.5 to 1.0, more preferably 0.6 to 0.9. According to the surface analysis by X-ray photoelectron spectroscopy of the reduced graphene-based material according to the present embodiment, the atom number ratio of carbon atoms based on oxygen atoms (C/O) is generally 15 or less, preferably 12 or less, more preferably 10 or less. The atom number ratio of carbon atoms based on oxygen atoms (C/O) is generally 1 or more.

The ratio of the area where the coating is formed on the surface of the reduced graphene material is not particularly limited, and the coating may be formed on a part of the surface, or the coating may be formed on the entire surface. The ratio of the area where the coating is formed on the surface of the reduced graphene-based material may be, for example, 50% or more.

<Lithium Ion Secondary Battery>

A lithium ion secondary battery can be produced using the reduced graphene-based material according to the present embodiment as a negative electrode active material. Hereinafter, a lithium ion secondary battery will be described for each component.

<Negative Electrode>

A negative electrode is formed, for example, such that a negative electrode active material is bound to a negative electrode current collector with a negative electrode binder so as to cover the negative electrode current collector.

The negative active material comprises a reduced graphene material having a coating derived from lithium difluorophosphate. The content of the reduced graphene-based material having a coating derived from lithium difluorophosphate in the negative active material is preferably 5% by mass or more, more preferably 20% by mass or more, and may be 100% by mass. By containing the reduced graphene-based material having a coating derived from lithium difluorophosphate, the charge/discharge efficiency of the lithium ion secondary battery can be improved.

A carbon material capable of absorbing and desorbing lithium ions can also be used in combination with the reduced graphene-based material having a coating derived from lithium difluorophosphate. For example, carbon materials such as graphite materials (artificial graphite, natural graphite), carbon black (acetylene black, furnace black), coke, meso-carbon microbeads, hard carbon and the like can be exemplified, and two or more thereof may be used in any combination and ratio.

Further, a material containing silicon (preferably silicon or silicon oxide) can also be used in combination with the reduced graphene-based material having a coating derived from lithium difluorophosphate.

The negative electrode binder is not particularly limited, and for example, polyvinylidene fluoride, vinylidene fluoride-hexafluoropropylene copolymer, vinylidene fluoride-tetrafluoroethylene copolymer, styrene-butadiene copolymer rubber (SBR), polytetrafluoroethylene, polypropylene, polyethylene, polyimide, polyamide-imide, polyacrylic acids (including a lithium salt, a sodium salt and a potassium salt), and carboxymethyl celluloses (including a lithium salt, a sodium salt and a potassium salt) and the like can be used. Among these, polyimide, polyamide-imide, SBR, polyacrylic acids, and carboxymethyl celluloses are preferable because strong adhesion can be attained by them. The amount of the negative electrode binder to be used is preferably 5 to 25 parts by mass relative to 100 parts by mass of the negative electrode active material from the viewpoint of a trade-off relationship between "binding force" and "energy density".

The negative electrode current collector is not particularly limited, and any one used in a general lithium ion secondary battery can be used. As the material of the negative electrode collector, for example, a metal material such as copper, nickel or SUS can be used. In particular, copper is particularly preferable from the viewpoint of workability and cost. The negative electrode current collector is preferably precedently subjected to a surface-roughening treatment. The shape of the negative electrode current collector may include foil, flat plate, mesh and the like. In addition, a negative electrode current collector of perforated-type, such as an expanded metal or a punching metal, can also be used.

The negative electrode can be produced by, for example, kneading a negative electrode active material, a negative electrode binder, various auxiliaries and the like as necessary, and a solvent to prepare slurry, applying the slurry onto a negative electrode current collector, and then drying it, and pressurizing it as necessary.

<Positive Electrode>

A positive electrode is formed, for example, such that a positive electrode active material is bound to a positive electrode current collector with a positive electrode binder so as to cover the positive electrode current collector.

As the positive electrode active material, a lithium transition metal composite oxide containing a transition metal such as cobalt, manganese or nickel, and lithium can be used.

Specific examples of such lithium transition metal composite oxide include $LiCoO_2$, $LiMnO_2$, $LiMn_2O_4$, $LiNiO_2$, $LiCo_{1-x}Ni_xO_2$ ($0.01<x<1$), $LiNi_{1/2}Mn_{3/2}O_4$, $LiNi_xCo_yMn_zO_2$ ($x+y+z=1$), $LiNi_{0.5}Mn_{1.5}O_4$, $LiFePO_4$ and the like. Further, those having excessive Li more than the stoichiometric composition in these lithium transition metal composite oxides (Li-excess lithium transition metal composite oxide) are also exemplified. The Li-excess transition metal composite oxide includes $Li_{1+a}Ni_xMn_yO_2$ ($0<a\leq0.5$, $0<x<1$, $0<y<1$), $Li_{1+a}Ni_xMn_yM_zO_2$ ($0<a\leq0.5$, $0<x<1$, $0<y<1$, $0<z<1$, M is Co or Fe), $Li_\alpha Ni_\beta Co_\gamma Al_\delta O_2$ ($1\leq\alpha\leq1.2$, $\beta+\gamma+\delta=1$, $\beta\geq0.7$, $\gamma\leq0.2$) and the like.

Further, the lithium transition metal composite oxide may be partially substituted with other elements to improve cycle characteristics or safety, or to enable the use at a high charge potential. For example, a part of cobalt, manganese or nickel may be replaced with at least one element such as Sn, Mg, Fe, Ti, Al, Zr, Cr, V, Ga, Zn, Cu, Bi, Mo, La, or a part of oxygen may be replaced with S or F, or alternatively, surface of the positive electrode may be coated with a compound containing these elements.

Examples of the specific composition of the lithium transition metal composite oxide of the present embodiment include $LiMnO_2$, $LiCoO_2$, $LiNiO_2$, $LiMn_2O_4$, $LiCo_{0.8}Ni_{0.2}O_2$, $LiNi_{1/2}Mn_{3/2}O_4$, $LiNi_{1/3}Co_{1/3}Mn_{1/3}O_2$ (abbreviated to NCM111), $LiNi_{0.4}Co_{0.3}Mn_{0.3}O_2$ (abbreviated to NCM433), $LiNi_{0.5}Co_{0.2}Mn_{0.3}O_2$ (abbreviated to NCM523), $LiNi_{0.5}Co_{0.3}Mn_{0.2}O_2$ (abbreviated to NCM532), $LiFePO_4$, $LiNi_{0.8}Co_{0.15}Al_{0.05}O_2$, $LiNi_{0.8}Co_{0.1}Mn_{0.1}O_2$, $Li_{1.2}Mn_{0.4}Ni_{0.4}O_2$, $Li_{1.2}Mn_{0.6}Ni_{0.2}O_2$, $Li_{1.19}Mn_{0.52}Fe_{0.22}O_{1.98}$, $Li_{1.21}Mn_{0.46}Fe_{0.15}Ni_{0.15}O_2$, $LiMn_{1.5}Ni_{0.5}O_4$, $Li_{1.2}Mn_{0.4}Fe_{0.4}O_2$, $Li_{1.21}Mn_{0.4}Fe_{0.2}Ni_{0.2}O_2$, $Li_{1.26}Mn_{0.37}Ni_{0.22}Ti_{0.15}O_2$, $LiMn_{1.37}Ni_{0.5}Ti_{0.13}O_{4.0}$, $Li_{1.2}Mn_{0.56}Ni_{0.17}Co_{0.07}O_2$, $Li_{1.2}Mn_{0.54}Ni_{0.13}Co_{0.13}O_2$, $Li_{1.2}Mn_{0.56}Ni_{0.17}Co_{0.07}O_2$, $Li_{1.2}Mn_{0.54}Ni_{0.13}Co_{0.13}O_2$, $LiNi_{0.8}Co_{0.15}Al_{0.05}O_2$, $LiNi_{0.5}Mn_{1.48}Al_{0.02}O_4$, $LiNi_{0.5}Mn_{1.45}Al_{0.05}O_{3.9}F_{0.05}$, $LiNi_{0.4}Co_{0.2}Mn_{1.25}Ti_{0.15}O_4$, $Li_{1.23}Fe_{0.15}Ni_{0.15}Mn_{0.46}O_2$, $Li_{1.26}Fe_{0.11}Ni_{0.11}Mn_{0.52}O_2$, $Li_{1.2}Fe_{0.20}Ni_{0.20}Mn_{0.40}O_2$, $Li_{1.29}Fe_{0.07}Ni_{0.14}Mn_{0.57}O_2$, $Li_{1.26}Fe_{0.22}Mn_{0.37}Ti_{0.15}O_2$, $Li_{1.29}Fe_{0.07}Ni_{0.07}Mn_{0.57}O_{2.8}$, $Li_{1.30}Fe_{0.04}Ni_{0.07}Mn_{0.61}O_2$, $Li_{1.2}Ni_{0.18}Mn_{0.54}Co_{0.08}O_2$, $Li_{1.23}Fe_{0.03}Ni_{0.03}Mn_{0.58}O_2$ and the like.

Further, two or more kinds of lithium transition metal composite oxides as described above may be mixed and used. For example, NCM532 or NCM523 and NCM433 in the range of 9:1 to 1:9 (as a typical example, 2:1) can be mixed and used, or, NCM532 or NCM523 and $LiMnO_2$, $LiCoO_2$, or $LiMn_2O_4$ in the range of 9:1 to 1:9 can be mixed and used.

The method for synthesizing the lithium transition metal composite oxide represented by the chemical formulae above is not particularly limited, and conventionally known methods for synthesizing an oxide can be applied.

A conductive assisting agent may be added to the positive electrode active material layer containing the positive electrode active material for the purpose of lowering the impedance. Examples of the conductive assisting agent include graphites such as natural graphite and artificial graphite; carbon blacks such as acetylene black, Ketjen black, furnace black, channel black and thermal black. Two or more kind of the conductive assisting agents may be suitably mixed and used. The amount of the conductive assisting agent is preferably 1 to 10% by mass relative to 100% by mass of the positive electrode active material.

Examples of the positive electrode binder include, but not particularly limited, polyvinylidene fluoride, vinylidene fluoride-hexafluoropropylene copolymer, vinylidene fluoride-tetrafluoroethylene copolymer and the like. Further, styrene-butadiene copolymer rubber, polytetrafluoroethylene, polypropylene, polyethylene, polyimide, polyamide-imide and the like may also be used as the positive electrode binder. In particular, polyvinylidene fluoride is preferably used as the positive electrode binder from the viewpoint of general versatility and cost reduction. The amount of the positive electrode binder to be used is preferably 2 to 10 parts by mass relative to 100 parts by mass of the positive electrode active material from the viewpoint of a trade-off relationship between "sufficient binding force" and "high energy".

As the positive electrode current collector, a general one can be arbitrarily used, and for example, an aluminium foil, a lath plate made of stainless steel, or the like can be used.

A positive electrode can be manufactured by, for example, mixing a positive electrode active material, a conductive assisting agent, and a binder to form a mixture, adding a solvent such as N-methylpyrrolidone to the mixture and kneading them, and coating the resultant on a current collector by doctor blade method, die coater method or the like, and drying.

<Non-Aqueous Electrolyte Solution>

The non-aqueous electrolyte solution of a lithium ion secondary battery is mainly composed of a non-aqueous solvent and an electrolyte. The non-aqueous solvent may include cyclic carbonates, open-chain carbonates, open-chain esters, lactones, ethers, sulfones, nitriles, phosphate esters and the like, and cyclic carbonates and open-chain carbonates are preferred.

Specific examples of the cyclic carbonates include propylene carbonate, ethylene carbonate, butylene carbonate, vinylene carbonate, vinyl ethylene carbonate and the like.

Specific examples of the open-chain carbonates include dimethyl carbonate, diethyl carbonate, dipropyl carbonate, dibutyl carbonate and the like. In addition, specific examples of the open-chain carbonates may also include ethyl methyl carbonate, methyl propyl carbonate, methyl isopropyl carbonate, methyl butyl carbonate and the like.

Specific examples of the open-chain esters include methyl formate, methyl acetate, methyl propionate, ethyl propionate, methyl pivalate, ethyl pivalate and the like.

Specific examples of the lactones include γ-butyrolactone, δ-valerolactone, α-methyl-γ-butyrolactone and the like.

Specific examples of the ethers include tetrahydrofuran, 2-methyltetrahydrofuran, 1,3-dioxolane, 1,3-dioxane, 1,4-dioxane, 1,2-dimethoxyethane, 1,2-diethoxyethane, 1,2-dibutoxyethane and the like.

Specific examples of the sulfones include sulfolane, 3-methyl sulfolane, 2,4-dimethyl sulfolane and the like.

Specific examples of the nitriles include acetonitrile, propionitrile, succinonitrile, glutaronitrile, adiponitrile and the like.

Specific examples of the phosphate esters include trimethyl phosphate, triethyl phosphate, tributyl phosphate, trioctyl phosphate and the like.

The non-aqueous solvents above may be used alone, or in combination of two or more. Examples of the combination of plural kinds of non-aqueous solvents include a combination of cyclic carbonates and open-chain carbonates. Excellent battery characteristics can be achieved by using a non-aqueous solvent comprising cyclic carbonates and open-chain carbonates.

Further, a non-aqueous solvent such as fluorinated ether-based solvents, fluorinated carbonate-based solvents, and fluorinated phosphate esters may be further added to the combination of cyclic carbonates and open-chain carbonates.

Specific examples of the fluorinated ether-based solvent include $CF_3OCH_3$, $CF_3OC_2H_5$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CF_2)_4CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2CH_2OCH_2CF_2CF_3$, $H(CF_2)_2CH_2OCF_2CHFCF_3$, $CHF_2CH_2OCF_2CFHCF_3$, $F(CF_2)_2CH_2OCF_2CFHCF_3$, $CF_3(CF_2)_3OCHF_2$ and the like.

Examples of the fluorinated carbonate-based solvent include fluoroethylene carbonate, fluoromethylmethyl carbonate, 2-fluoroethylmethyl carbonate, ethyl-(2-fluoroethyl) carbonate, (2,2-difluoroethyl) ethyl carbonate, bis(2-fluoroethyl) carbonate, ethyl-(2,2,2-trifluoroethyl) carbonate and the like.

Examples of the fluorinated phosphate ester include tris (2,2,2-trifluoroethyl) phosphate, tris(trifluoromethyl) phosphate, tris(2,2,3,3-tetrafluoropropyl) phosphate and the like.

Specific examples of the electrolyte include lithium salts such as lithium hexafluorophosphate ($LiPF_6$), lithium bis (fluorosulfonyl) imide [$LiN(SO)_2F)_2$], $LiBF_4$, $LiClO_4$, $LiN(SO_2CF_3)_2$, $LiN(SO_2C_2F_5)_2$, $CF_3SO_3Li$, $C_4F_9SO_3Li$, $LiAsF_6$, $LiAlCl_4$, $LiSbF_6$, $LiPF_4(CF_3)_2$, $LiPF_3(C_2F_5)_3$, $LiPF_3(CF_3)_3$, $(CF_2)_2(SO_2)_2NLi$, $(CF_2)_3(SO_2)_2Li$, lithium bis (oxalate) borate ($LiC_4BO_8$), lithium difluoro(oxalate) borate [$LiBF_2(C_2O_4)$] and the like. These lithium salts may be used alone or in combination of two or more. In particular, $LiPF_6$ and $LiN(SO_2F)_2$ are preferably contained. $LiN(SO_2F)_2$ can improve charge rate characteristics. On the other hand, $LiN(SO_2F)_2$ has a problem of corroding the aluminium of the positive electrode current collector when used alone. Therefore, it is preferable to use both of $LiPF_6$ and $LiN(SO_2F)_2$, and at that time, it is possible to suppress the corrosion of aluminium while maintaining high charge rate characteristic by using $LiPF_6$ at a concentration of 0.3 M or more in the electrolyte solution.

The concentration of the electrolyte dissolved in the non-aqueous electrolyte solution is preferably in the range of 0.3 to 3 mol/L, and more preferably in the range of 0.5 to 2 mol/L. More sufficient ionic conductivity can be obtained when the concentration of the electrolyte is 0.3 mol/L or more. When the concentration of the electrolyte is 3 mol/L or less, an increase of the viscosity of the electrolyte solution is suppressed, and more sufficient ion mobility and impregnation property can be obtained.

<Separator>

As a separator, while not particularly limited, a single layer type or stacked layer type of porous film or nonwoven fabric made of resin materials such as polyolefin such as polypropylene and polyethylene may be used. Further, a film obtained by coating or laminating a different material on a resin layer of polyolefin or the like can also be used. Examples of such film include those having a polyolefin substrate coated with a fluorine compound or inorganic fine particles, or having a polyolefin substrate on which an aramid layer is laminated.

The thickness of the separator is preferably 5 to 50 μm, and more preferably 10 to 40 μm, from the viewpoint of the energy density of the battery and the mechanical strength of the separator.

<Structure of Lithium Ion Secondary Battery>

The form of the lithium ion secondary battery is not particularly limited, but includes a coin type battery, a button type battery, a cylindrical type battery, a square type battery, a laminated type battery and the like.

For example, a battery of a laminated type can be made by forming a laminate body in which a positive electrode(s), a separator(s) and a negative electrode(s) are laminated alternately, and connecting a metal terminal called tab to each electrodes, putting them into a container formed of a laminate film, which is an outer package, and injecting an electrolyte solution thereto and sealing it.

The laminate film can be suitably selected from those stable to the electrolyte solution and having sufficient water vapor barrier properties. As such a laminate film, for example, a laminate film of polyolefin (such as polypropylene, polyethylene) coated with an inorganic material such as aluminium, silica or alumina may be used. In particular, from the viewpoint of suppressing volume expansion, an aluminium laminate film made of polyolefin coated with aluminium is preferred.

A typical example of the layered structure of the laminate film has a structure in which a metal thin film layer and a thermofusible resin layer are laminated. A resin film (protective layer) made of polyester such as polyethylene terephthalate or polyamide such as nylon may be further laminated on the surface of the metal thin film layer opposite to the thermofusible resin layer side. The thermofusible resin layers of the two laminate films are opposed to each other so that the container made of the laminate films and housing the laminate body comprising the positive electrode and the negative electrode can be sealed. As the metal thin film layer of the laminate film, for example, a foil of Al, Ti, Ti alloy, Fe, stainless steel, Mg alloy or the like having a thickness of 10 to 100 μm can be used. The resin used for the thermofusible resin layer is not especially limited as long as it is capable of fusion-bonding with heat, but may include, for example, polypropylene, polyethylene, an acid-modified product of these resins, polyphenylene sulfide, polyester such as polyethylene terephthalate, polyamide, an ethylene-vinyl acetate copolymer, or an ionomer resin obtained by intermolecular bonding an ethylene-methacrylic acid copolymer or an ethylene-acrylic acid copolymer with metal ion. The thickness of the thermofusible resin layer is preferably 10 to 200 μm, and more preferably 30 to 100 μm.

EXAMPLES

The present invention will be more specifically described below with reference to examples, but it is noted that the present invention is not limited to these examples.

Synthesis Example 1: Reduced Graphene-Based Material 1

10 g of scale-like graphite powder having an average particle size of 20 μm was added to 100 ml of fuming nitric acid, and then cooled to 0° C. 80 g of potassium chlorate was added thereto little by little, and then the mixture was stirred at 0 to 5° C. for 3 hours. Ice water was added to the reaction mixture, and the precipitated precipitate was filtered off, washed with water, and dried to obtain 14.5 g of oxidized graphene. Next, 0.3 g of lithium difluorophosphate was dissolved in 60 ml of acetonitrile, and 6 g of the obtained oxidized graphene was added thereto. Acetonitrile was distilled off by an evaporator. Next, under a nitrogen stream, the oxidized graphene was heated to 280° C. over 21 hours, held at 280° C. for 1 hour, then heated to 700° C., and held at 700° C. for 1 hour to obtain Reduced graphene-based material 1 having a coating derived from lithium difluorophosphate.

Synthesis Example 2: Reduced Graphene-Based Material 2

Reduced graphene-based material 2 having a coating derived from lithium difluorophosphate was synthesized in a similar manner as Synthesis Example 1. However, the amount of lithium difluorophosphate was changed to 0.6 g.

Synthesis Example 3: Reduced Graphene-Based Material 3

10 g of scale-like graphite powder having an average particle size of 20 μm was added to 100 ml of fuming nitric acid, and then cooled to 0° C. 80 g of potassium chlorate was added thereto little by little, and then the mixture was stirred at 0 to 5° C. for 3 hours. Ice water was added to the reaction mixture, and the precipitated precipitate was filtered off, washed with water, and dried to obtain 14.5 g of oxidized graphene. Next, under a nitrogen stream, the oxidized graphene was heated to 280° C. over 21 hours, held at 280° C. for 1 hour, then heated to 700° C., and held at 700° C. for 1 hour to obtain Reduced graphene-based material 3.

(XPS Analysis of Reduced Graphene)

The surface elemental composition of the reduced graphene-based materials obtained in Synthesis Examples 1 to 3 was measured by X-ray photoelectron spectroscopy (XPS). In the measurement, the surface of sample was irradiated with a soft X-ray in an ultravacuum, and the photoelectrons emitted from the surface were detected by the analyser.

The element composition (atomic %) is summarized in Table 1, and the atom number ratio of each element based on lithium atoms is summarized in Table 2. The XPS analysis result of lithium difluorophosphate used for forming the coating is also shown in Table 1 and Table 2 as a comparative example. As shown in Table 2, the reduced graphene-based materials having a coating derived from lithium difluorophosphate had F/Li of 0.07 to 0.08, and P/Li of 0.75 to 0.8. Lithium difluorophosphate used for forming the coating had F/Li of about 2, and P/Li of 1.04. From these results, it was revealed that in the reduced graphene-based material of the present invention, lithium difluorophosphate reacts on the surface of the reduced graphene-based material particles to form a coating having a composition different from that of lithium difluorophosphate.

TABLE 1

| XPS analysis results: elemental composition (atomic %) | | | | | |
|---|---|---|---|---|---|
| Synthetic Examples | Li | C | O | F | P |
| 1 | 1.2 | 88.7 | 8.9 | 0.1 | 0.9 |
| 2 | 1.5 | 86.3 | 10.4 | 0.1 | 1.2 |
| 3 |  | 92.1 | 7.9 |  |  |
| LiPO$_2$F$_2$ | 15.3 |  | 33.9 | 34.9 | 15.9 |

TABLE 2

| XPS analysis results: atom number ratio based on lithium atoms | | | |
|---|---|---|---|
| Synthetic Examples | F/Li | P/Li | Li/Li |
| 1 | 0.08 | 0.75 | 1.0 |
| 2 | 0.07 | 0.8 | 1.0 |
| LiPO$_2$F$_2$ | 2.21 | 1.04 | 1.0 |

Example 1

(Production Example of Negative Electrode 1)

Reduced graphene-based material 1 obtained in Synthesis Example 1 (89% by mass), carbon black (3% by mass), carboxymethyl cellulose (5% by mass), and SBR (3% by mass) were mixed, and water was added thereto to obtain a slurry. The slurry was applied on one side of a negative electrode current collector made of copper foil (having a thickness of 15 μm). This was dried to obtain a single-sided negative electrode having a negative electrode active material layer formed on one side of the negative electrode current collector.

Example 2

(Production Example of Negative Electrode 2)

Reduced graphene-based material 2 obtained in Synthesis Example 2 (89% by mass), carbon black (3% by mass), carboxymethyl cellulose (5% by mass), and SBR (3% by mass) were mixed, and water was added thereto to obtain a slurry. The slurry was applied on one side of a negative electrode current collector made of copper foil (having a thickness of 15 μm). This was dried to obtain a single-sided negative electrode having a negative electrode active material layer formed on one side of the negative electrode current collector.

Comparative Example 1

(Production Example of Negative Electrode 3)

Reduced graphene-based material 3 obtained in Synthesis Example 3 (89% by mass), carbon black (3% by mass), carboxymethyl cellulose (5% by mass), and SBR (3% by mass) were mixed, and water was added thereto to obtain a slurry. The slurry was applied on one side of a negative electrode current collector made of copper foil (having a thickness of 15 µm). This was dried to obtain a single-sided negative electrode having a negative electrode active material layer formed on one side of the negative electrode current collector.

<Preparation of Electrolyte Solution>

Ethylene carbonate (EC) and diethyl carbonate (DEC) were mixed at a volume ratio of 30/70 (EC/DEC) to prepare a non-aqueous solvent. $LiPF_6$ was dissolved at a concentration of 1 mol/L into the non-aqueous solvent to prepare an electrolyte solution.

<Preparation of Test Cells>

After forming the negative electrode prepared by the above method, and Li foil into a predetermined shape, they were laminated with a porous film separator sandwiched therebetween, and tabs were welded respectively to obtain a power generating element. The power generating element was wrapped in an outer body made of an aluminium laminate film, and the three end edges were heat-sealed. The electrolytic solution was injected into the outer body, and was impregnated into the power generating element under an appropriate degree of vacuum. Then, the remaining one end edge was heat-sealed under reduced pressure to obtain test cells of Examples 1 and 2 and Comparative Example 1, respectively.

<Cell Evaluation>

The prepared cells were charged to 0 V at a constant current constant voltage of 0.1 C and discharged to 2 V at a constant current of 0.1 C in a constant temperature bath at 20° C. The initial charge/discharge efficiency was obtained from the ratio of the charge capacity and the discharge capacity obtained in this way. The obtained results are summarized and shown in Table 3. From the comparison between Examples 1 and 2 and Comparative Example 1, it was found that the initial charge/discharge efficiency of the cells using the reduced graphene-based material having a coating derived from lithium difluorophosphate was improved.

TABLE 3

|  | Charge capacity (mAh/g) | Discharge capacity (mAh/g) | Initial charge/discharge efficiency (%) |
|---|---|---|---|
| Example 1 | 932 | 518 | 56 |
| Example 2 | 899 | 501 | 56 |
| Comparative Example 1 | 1013 | 516 | 51 |

This application is based upon and claims the benefit of priority from Japanese patent application No. 2018-107533, filed on Jun. 5, 2018, the disclosure of which is incorporated herein in its entirety by reference.

Although the present invention has been described with reference to embodiments and examples, the present invention is not limited to the above embodiments and examples. The configuration and details of the present invention may be changed variously within the scope of the present invention to the extent that a person skilled in the art can understand.

INDUSTRIAL APPLICABILITY

The lithium ion secondary battery using the reduced graphene-based material according to the present embodiment has a high capacity and improved initial charge/discharge efficiency, and thus can be utilized in, for example, all the industrial fields requiring a power supply and in the industrial fields pertaining to the transportation, storage and supply of electric energy. Specifically, it can be used as a power source for mobile devices such as mobile phones, laptop computers, tablet terminals, and portable game machines. Further, it can also be used as a power source for moving/transporting media such as electric vehicles, hybrid cars, electric bikes, electrically assisted bicycles, transport carts, robots, and drones (small unmanned aerial vehicles). Further, it can be used for a household power storage system, a backup power source such as UPS, a power storage facility for storing power generated by solar power generation, wind power generation, or the like.

The invention claimed is:

1. A negative electrode active material capable of absorbing and desorbing lithium ions, the negative electrode active material comprising:
   a reduced graphene-based material; and
   a coating containing lithium element (Li), phosphorus element (P), fluorine element (F), and oxygen element (O) on at least a part of a surface of the reduced graphene-based material,
   wherein in the elemental composition of the surface as measured by X-ray photoelectron spectroscopy (XPS), the proportion of lithium element (Li) is 0.8 to 2.0 (atomic %), the proportion of phosphorus element (P) is 0.5 to 2.0 (atomic %), the proportion of fluorine element (F) is 0.05 to 1.0 (atomic %), and the proportion of oxygen element (O) is 7.0 to 12.0 (atomic %).

2. A lithium ion secondary battery, comprising:
   a positive electrode comprising a positive electrode active material capable of absorbing and desorbing lithium ions,
   a negative electrode comprising the negative electrode active material according to claim 1, and
   a non-aqueous electrolyte solution.

3. The lithium ion secondary battery according to claim 2, wherein the content of said reduced graphene-based material in said negative electrode active material is 5% by mass or more.

4. A method for producing a reduced graphene-based material, comprising a step of heat-treating an oxidized graphene together with lithium difluorophosphate at a temperature of 500 to 1000° C.

* * * * *